Aug. 13, 1940.  W. HILGERS  2,211,655

BUTTER CUTTING MACHINE

Filed March 22, 1939

INVENTOR
WILHELM HILGERS
By Norris & Bateman
ATTORNEYS

Patented Aug. 13, 1940

2,211,655

UNITED STATES PATENT OFFICE 2,211,655

BUTTER CUTTING MACHINE

Wilhelm Hilgers, Dusseldorf, Germany

Application March 22, 1938, Serial No. 197,491
In Germany December 24, 1937

6 Claims. (Cl. 31—5)

The molding and packing of butter is carried out in dairies and by wholesale dealers in butter, and widely varying types of butter molding, including the use of automatically operating machines, are known. These known machines consist fundamentally of a compression chamber provided with a charging hopper and also a device for shaping the butter, as for example a molding chamber, a mouthpiece or the like. The butter brought into the compression chamber through the charging hopper, in known machines, is introduced into the molding device by worms mounted in the compression chamber.

The butter fed to molding machines is cooled to a low temperature, irrespective of whether it be fresh butter or butter which has been in storage. This feature is economically favorable as markedly cooled butter will withstand further storage even after automatic molding. It is however, disadvantageous in that markedly cooled butter, that is to say hard butter, requires a high compressive force for molding it, as otherwise the molding chambers are not charged properly and with an exact weight of butter. Moreover, the high compressive force exerted by the pressure worms on the butter in certain cases adversely affects the quality of the butter and also subjects the working parts of the machine to unduly great stress.

An object of the invention is to provide an apparatus which considerably facilitates the working of markedly cooled butter, i. e. hard butter, in butter molding machines.

The apparatus according to the invention consists of a butter cutter which serves to comminute the markedly cooled butter which is delivered in large masses, so that the butter is fed to the butter molding machine in small pieces and not in disc-like blocks or thick slices as formerly.

This pretreatment of the butter obviates the aforesaid disadvantages, as the function of the pressure worms of the molding machine, because of such pretreatment, is only to force the loosened but flaky coherent mass of butter into the compression chamber, whereas formerly and without such pretreatment of the butter, the pressure worms were required to perform the additional function of comminuting and compressing butter, which had been inserted in large pieces, in front of the molds.

According to the present invention, the butter cutter consists of knives the cutting edges of which are disposed in a common plane, the knives being mounted on shafts which are driven by a motor, gearing or the like, so that the knives rotate about their own axes which axes travel in a circular orbit.

The butter cutter according to the present invention has the advantage that a number of small cutting edges are caused to operate on the mass of butter so that the amount of power required to drive the machine is small, although the entire surface of the mass of butter, which is delivered, for example in a barrel-shaped mass, is cut by the knives.

The accompanying drawing illustrates a typical embodiment of the invention. In the drawing.

Figure 1:
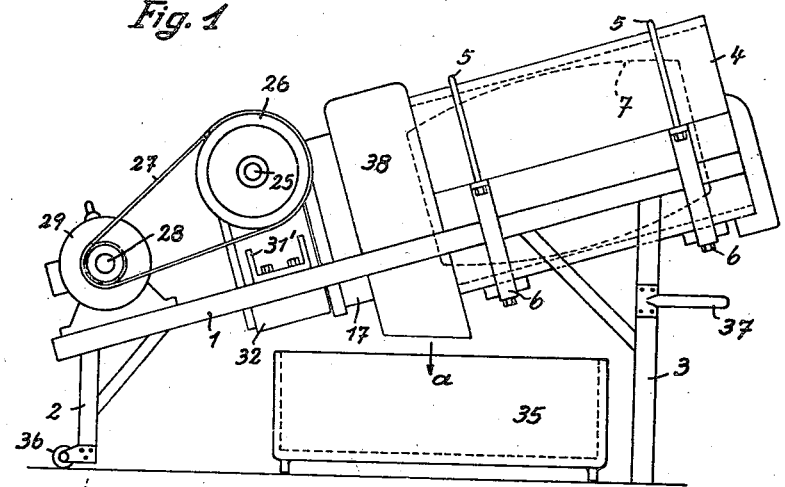
Fig. 1 is a front elevation of a butter cutter.

1 denotes the main supporting frame of the entire apparatus which is supported in an inclined position by the legs 2 and 3. The frame 1 carries, at its higher end, a chamber 4, preferably of hexagonal or other polygonal cross-section. The chamber 4 is fixed to the frame 1 by hoops 5 or the like which are secured to the frame 1 by screws 6. The chamber 4 serves as means for guiding and thus conducting to the cutting device the mass of butter 7 which is delivered to said chamber in the form of a barrel-shaped mass. As the cutting device tends to revolve the mass of butter in the chamber 4, battens 8, which are arranged to penetrate the butter, are provided in said chamber to prevent the mass of butter from rotating during the cutting operation.

In front of the discharge opening in the chamber 4 there are arranged two rotating radially extending knives 9 and 10, the cutting blades 11 of which, as shown, are fixed on the knife supports 12 so as to extend obliquely to the axis of rotation. The dimensions of the supports 12 are such that the cutting edges of the blades 11 of the rotating knives project clear of these supports, and the surfaces 13 of these supports form abutments which prevent the projecting blades 11 of the rotating knives 9 and 10 from penetrating too deeply into the butter while cutting it. By adjustment of the blades 11 in the inclined slots 14 in the supports 12, the depth of cut of the knives can be regulated.

The rotating knives 9 and 10 are mounted on shafts 15 and 16 respectively which are mounted in a hood or housing 17. The two shafts 15 and 16 have pinions 18 and 19 fixed thereon which form the planet wheels of a sun wheel 20. The sun wheel 20 is coaxial with a shaft 21 to which is fixed a flange 22 which carries the hood 17, the latter being provided with bearings for the shafts 15 and 16, and the shaft 21 also has fixed to it a worm wheel 23 which meshes with a worm 24. The shaft 25 to which the worm 24 is fixed also carries a pulley 26, which is the driving member for the worm 24, said pulley being coupled by a belt 27 with the driving shaft 28 of a motor 29. It should be noted that the worm wheel 23 is keyed firmly to the shaft 21 by a key 30, so that the rotary movements of the worm wheel 23 are transmitted to the shaft 21. The sun wheel 20, however, is fixed to the wall 31 of the housing 32 which is fixed by means of lugs 31' to the frame 1, and, therefore, the wheel 20 does not revolve with the shaft 21 but remains in the position in which it is secured by the screws 33.

The hood 17 which carries the shafts 15 and 16 of the knives 9 and 10, is fixedly connected to the shaft 21 by the key 34. When the shaft 21 revolves, the shafts 15 and 16 also revolve about the axis of the shaft 21. The toothed wheels 18 and 19 at the same time cause the shafts 15 and 16 to revolve on their own axes, as the pinions 18 and 19 move round the stationary sun wheel 20.

The rotatory and orbital movements of the shafts 15 and 16 produced by the sun-and-planet gearing 18, 19, 20 cause movement of the blades 11 over the entire surface of the inserted barrel-shaped mass of butter which is thereby cut uniformly into strips.

Figure 2:
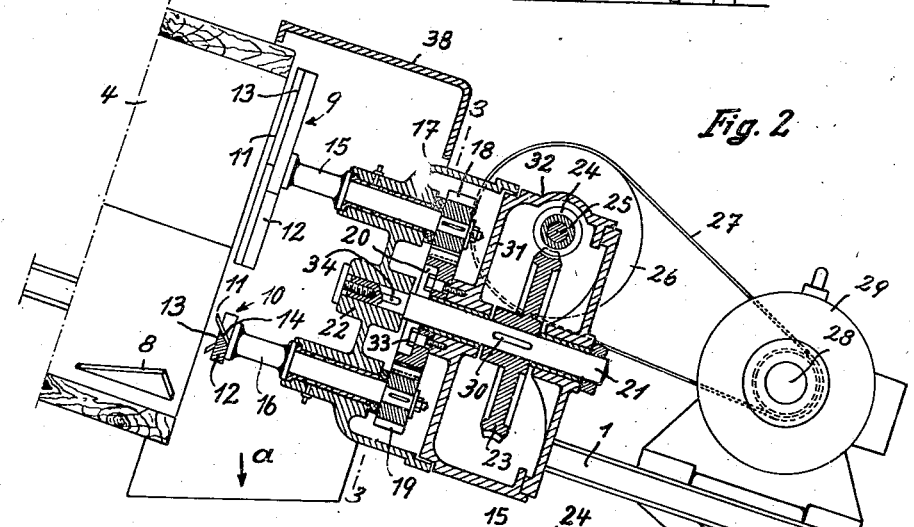
Fig. 2 is a sectional rear elevation showing the main working members of the butter cutter.
Figure 3:
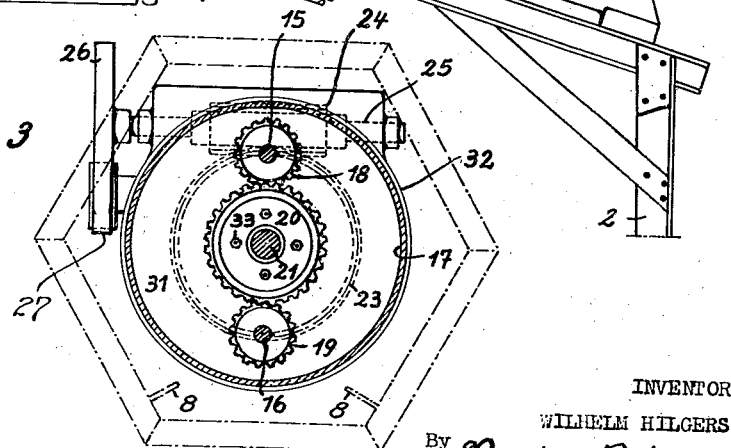
Fig. 3 is a section through the butter cutter along the line 3—3 in Fig. 2.

The cut butter falls in the direction indicated by the arrow a in Fig. 2 and is caught by a vessel 35 shown in Fig. 1. The butter can be transferred by means of scoops from the vessel 35 into a molding machine.

In many cases it is advisable that the entire apparatus should not be stationary. The legs 2 are, therefore, provided with rollers or casters 36, while the legs 3 are provided with handles 37. By means of these devices, the butter cutter can be moved about with facility in the manner of a barrow, as the main weight is carried by the rollers 36.

In order to protect the operatives from injury, it is advisable to provide a hood 38 which is open at the bottom, and which is so arranged that it covers the rotating and orbitally moving knives 9 and 10.

Having thus described the nature of the said invention and the best means I know of carrying the same into practical effect, I claim:

1. A butter cutting machine for cutting large masses of butter into small pieces, comprising a plurality of knife blades arranged with their cutting edges extending transversely with respect to a common axis and facing in the same general direction, means for conducting a mass of butter to the knife blades, means for rotating the knife blades bodily about a common axis, and means for rotating the said axis as a whole.

2. A butter cutting machine for cutting large masses of butter into small pieces, comprising a sun-and-planet gear, a plurality of knife blades carried by the planet wheel of the said gear and arranged with their cutting edges extending transversely with respect to the axis of the planet wheel, means for conducting a mass of butter to the knife blades, means for holding fixed the sun wheel of the sun-and-planet gear, and means for rotating the planet wheel about the sun wheel.

3. A butter cutting machine for cutting large masses of butter into small pieces, comprising a knife support, a plurality of knife blades mounted on and projecting forward from the knife support and arranged with their cutting edges extending transversely with respect to a common axis, means for conducting a mass of butter to the knife blades and against the knife support, the knife support thereby serving as an abutment for the butter, means for rotating the knife blades bodily about the said common axis, and means for rotating the said axis as a whole.

4. A butter cutting machine for cutting large masses of butter into small pieces, comprising a sun-and-planet gear, a knife support carried by the planet wheel of the said gear, a plurality of knife blades mounted on and projecting forwardly from the knife support and arranged with their cutting edges extending transversely with respect to the axis of the planet wheel, means for conducting a mass of butter against the knife blades and against the knife support, the knife support thereby serving as an abutment for the butter, means for holding fixed the sun wheel of the sun-and-planet gear, and means for rotating the axis of the planet wheel about the axis of the sun wheel.

5. A butter cutting machine for cutting large masses of butter into small pieces, comprising a plurality of substantially rectilinear knife blades arranged with their cutting edges substantially in a common plane and facing in the same general direction, means for conducting a mass of butter to said knife blades, means for rotating the knife blades bodily about a common axis, and means for rotating the said axis as a whole.

6. A butter cutting machine for cutting large masses of butter into small pieces, comprising a knife support, a plurality of substantially rectilinear knife blades mounted on and projecting forwardly from the knife support and arranged with their cutting edges substantially in a common plane, means for conducting a mass of butter to the knife blades and against the knife support, the knife support thereby serving as an abutment for the butter, means for rotating the knife blades bodily about a common axis, and means for rotating the said axis as a whole.

WILHELM HILGERS.